United States Patent
Du

(10) Patent No.: US 9,885,894 B2
(45) Date of Patent: Feb. 6, 2018

(54) SPLICED DISPLAY DEVICE AND DISPLAY SYSTEM

(71) Applicant: BOE TECHNOLOGY GROUP CO., LTD., Beijing (CN)

(72) Inventor: Zhihong Du, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 169 days.

(21) Appl. No.: 14/803,235

(22) Filed: Jul. 20, 2015

(65) Prior Publication Data

US 2016/0161792 A1    Jun. 9, 2016

(30) Foreign Application Priority Data

Dec. 9, 2014   (CN) .......................... 2014 1 0751232

(51) Int. Cl.
*G02F 1/1333*   (2006.01)

(52) U.S. Cl.
CPC .... *G02F 1/133308* (2013.01); *G02F 1/13336* (2013.01); *G02F 2001/133322* (2013.01); *G02F 2201/46* (2013.01)

(58) Field of Classification Search
CPC ...... F21V 14/02; F21V 21/26; F21Y 2115/10; G02B 27/2214; G02B 3/005; G02F 1/133308; G02F 1/13336; G02F 2001/133322; G02F 2201/46; G06F 3/1446; G09G 2310/0224
See application file for complete search history.

(56) References Cited

U.S. PATENT DOCUMENTS

| | | | | |
|---|---|---|---|---|
| 2002/0142501 A1* | 10/2002 | Seligson | ............. | G02F 1/13336 438/22 |
| 2005/0093768 A1* | 5/2005 | Devos | ................... | G06F 3/1446 345/1.3 |
| 2006/0075666 A1* | 4/2006 | Thielemans | .............. | G06F 3/14 40/448 |

FOREIGN PATENT DOCUMENTS

| | | |
|---|---|---|
| CN | 2389405 Y | 7/2007 |
| CN | 102402027 A | 4/2012 |
| CN | 203309471 U | 11/2013 |
| CN | 203573300 U | 4/2014 |
| CN | 203689836 U | 7/2014 |
| KR | 100949467 B1 | 3/2010 |

OTHER PUBLICATIONS

Second Chinese Office Action, for Chinese Patent Application No. 201410751232.0, dated Nov. 22, 2016, 13 pages.
Chinese Office Action, for Chinese Patent Application No. 201410751232.0, dated Jun. 21, 2016, 12 pages.
Third Chinese Office Action, for Chinese Patent Application No. 201410751232.0, dated May 17, 2017, 10 pages.

* cited by examiner

*Primary Examiner* — Huyen Ngo
(74) *Attorney, Agent, or Firm* — Kinney & Lange, P.A.

(57) ABSTRACT

The present disclosure relates to the field of display technologies, and particularly, to a spliced display device and a display system. The spliced display device comprises: a frame; and a plurality of display modules; wherein the plurality of display modules is spliced into an image displaying region, and the frame is disposed around a periphery of the image displaying region. The spliced display device has advantages of high structural strength and be difficult to deform under the action of external force.

16 Claims, 4 Drawing Sheets

SPLICED DISPLAY DEVICE AND DISPLAY SYSTEM

CROSS-REFERENCE TO RELATED APPLICATION

This application claims the benefit of Chinese Patent Application No. 201410751232.0 filed on Dec. 9, 2014 in the State Intellectual Property Office of China, the whole disclosure of which is incorporated herein by reference.

BACKGROUND

Technical Field

The present disclosure relates to the field of display technologies, and particularly, to a spliced display device and a display system, and more particularly, to a spliced display device and a display system with high structural strength.

Description of the Related Art

A spliced display device is a large-scale screen display system which is integration of ultra-thin rim liquid crystal displaying technology, TV wall splicing technology, multi-screen graphic processing technology, network technology, and the likes, which has high brightness, high resolution, high definition, high intelligent control and advance operation, and, which can be connected/integrated well with user monitoring system, command dispatching system, network information system, and the likes, to form a technically perfect, fully functional interactive information displaying and management platform. Nowadays, conventional spliced display device is consisted of several independent display modules connected by fasteners such as screws. Since transparent liquid crystal panels are usually served as screen in the spliced display device and no fastening component should be employed at back of a display region of the screen, they are fixed to each other at the splicing place, by fasteners such as screws, accumulating all the forces on rims of these panels at the splicing place. Moreover, the rims usually have thinner structure and are easy to deform under the action of external force after the splicing. Thus it can be seen, the spliced display device which is fixed by fasteners such as screws is complicated in operation, has low structural strength, and is easy to deform.

Accordingly, in order to overcome and/or alleviate the abovementioned defects, there requires a spliced display device which is difficult to deform and owns high structural strength.

SUMMARY

According to one aspect of the present disclosure, there is provided a spliced display device, comprising: a frame; and a plurality of display modules; wherein the plurality of display modules is spliced into an image displaying region, and the frame is disposed around a periphery of the image displaying region.

According to another aspect of the present disclosure, there is provided a display system comprising the above-mentioned spliced display device.

BRIEF DESCRIPTION OF THE DRAWINGS

These and/or other aspects and advantages of the present disclosure will become apparent and more readily appreciated from the following description of the embodiments, taken in conjunction with the accompanying drawings of which.

REFERENCE NUMERALS

1—clasp, 2—display module, 23—clasp hole, 3—frame, 31—transverse frame part, 32—longitudinal frame part, 35—mounting hole, 4—fastener, 5—cross, 51—securing hole, 6—connection element, 61—longitudinal connection element, and, 65—joint.

DETAILED DESCRIPTION OF THE EMBODIMENTS

In order to provide a more clear understanding of objects, technique solutions and advantages of the present disclosure, the present disclosure will be further described hereinafter in detail in conjunction with preferred embodiments and with reference to the attached drawings. Obviously, the embodiments illustrated in these drawings are only disclosed simply as an example of an embodiment. For those skilled in the art, other embodiments may be achieved by referring to the following embodiments without involving any inventive steps.

In the description of the present disclosure, it should be noted that, unless otherwise specified and defined definitely, terminologies "mount", "connect to", "connect with" and the likes should be explained and illustrated in a broad sense, for example, it can be a fixed connection, or a detachable connection, or an integrated connection; or, it also can be a mechanical connection or an electrical connection; or else, it can be a direct connection or an indirect connection with an intermediate agency. For those skilled in the art, the above terminologies can be explained and illustrated in specific situations in the present disclosure.

First Embodiment

Figure 1:
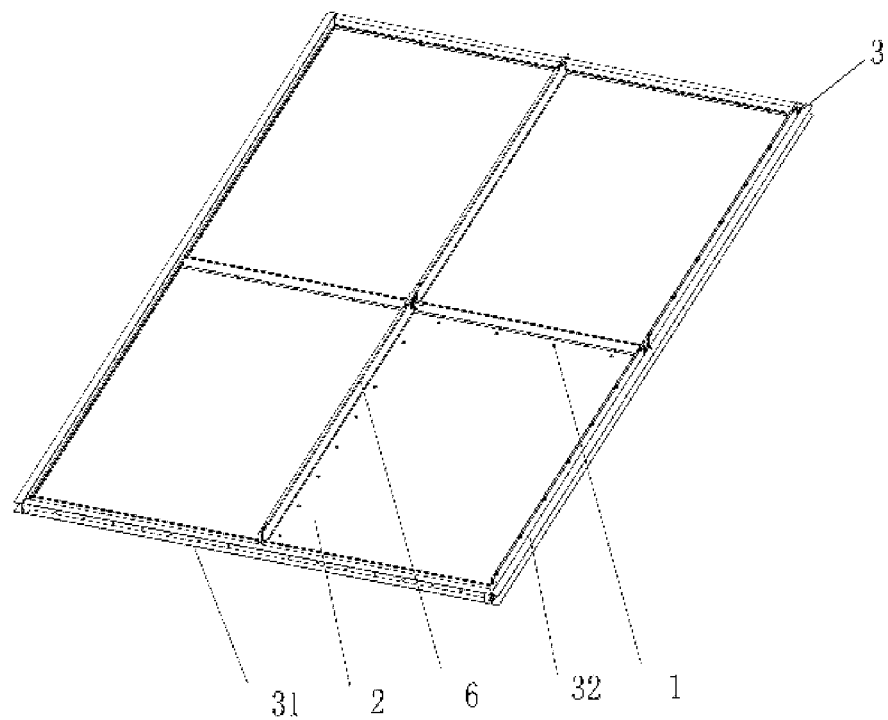
FIG. 1 is a structural schematic view of a spliced display device according to an embodiment of the present disclosure.

Referring to FIG. 1, in this embodiment, there provides a spliced display device. The spliced display device comprises a frame 3 and a plurality of display modules 2, the plurality of display modules 2 is spliced to form an image displaying region, and the frame 3 is disposed around a periphery of the image displaying region. Problem of easy to deform due to thinner rims is avoided by provision of the frame around the periphery of the image displaying region. Form of the frame may be flexibly adjusted depending on shape of the image displaying region. Taking a preferable manner as an example, if the image displaying region has a rectangular shape, then the frame 3 is in a rectangular form. For a rectangular frame, the frame 3 may include transverse frame parts 31 and longitudinal frame parts 32 connected to the transverse frame parts 31, and, the transverse frame parts 31 and the longitudinal frame parts 32 are secured to the periphery of the image displaying region.

Figure 5:
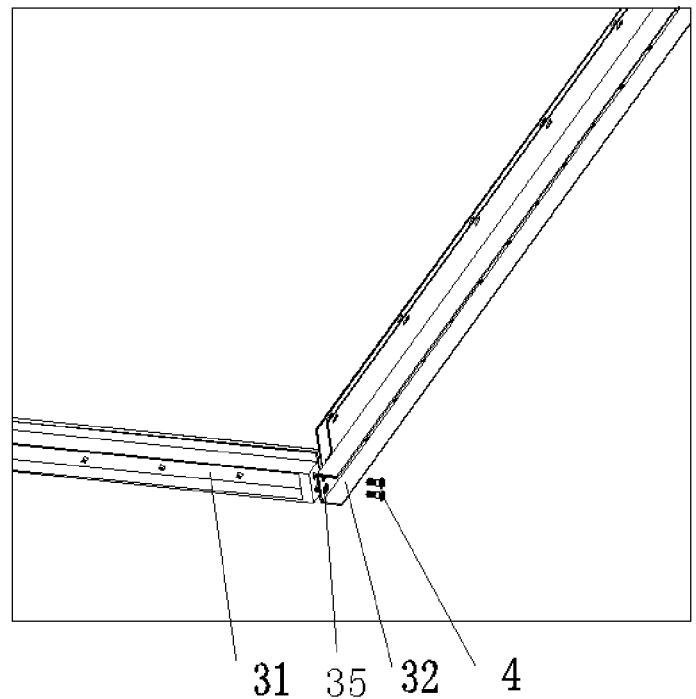
FIG. 5 is a schematic view of connections between transverse frame parts and longitudinal frame parts according to an embodiment of the present disclosure.

Moreover, referring to FIG. 5, mounting holes 35 are respectively provided at corresponding locations of the transverse frame parts 31 and longitudinal frame parts 32, the transverse frame parts 31 are connected to the longitudinal frame parts 32 by securing fasteners 4 such as screws into the mounting holes 35, and, clearances are formed among the transverse frame parts 31 and the longitudinal frame parts 32. Presence of the clearances ensures that enough preloading force is applied when securing the fasteners 4 such as screws into the mounting holes 35. For example, when the transverse frame parts 31 are securely connected with longitudinal frame parts 32 through the fasteners 4 such as screws, the splicing faces of these display modules 2 are fixedly affixed with each other under the action of the transverse preloading force, achieving the fixation and fastness. Of course, there may no clearances formed among the transverse frame parts 31 and the longitudinal frame parts 32, and these parts are in contact with each other after the connections, achieving the fixation and fastness.

It should be noted that quantity and form of the display modules 2 are not specified and can be modified depending on practical situation. For example, if the number of the display modules 2 is preferably four, then the display module 2 is in a rectangular form. Of course, other quantity and form of the display modules 2 fall into the scope of the present disclosure.

Moreover, transparent liquid crystal panels are served as the display modules 2 and are mounted on the frame for panels respectively. Locating holes (which are hidden under the clasps 1 in the figure) for securing clasps 1 or the fasteners 4 such as clasps screws therein are formed on the frame for panels. During assembly of the plurality of such display modules 2, clasps 1 or screws 4 may be secured respectively into locating holes of these adjacent frames for panels, in order to splice these display modules 2 together, while the frame 3 is provided around the periphery of the display modules 2 after the splicing, achieving reinforcement.

Second Embodiment

A spliced display device according to a second embodiment of the present disclosure will be described, wherein technical contents of the second embodiment which are the same as those of the first embodiment are omitted to avoid duplicating description, although such technical contents of the first embodiment can be employed in the second embodiment.

Figure 3:
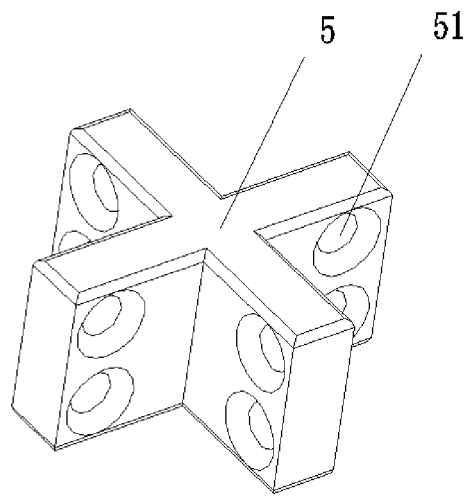
FIG. 3 is a structural schematic view of across according to an embodiment of the present disclosure.
Figure 4:
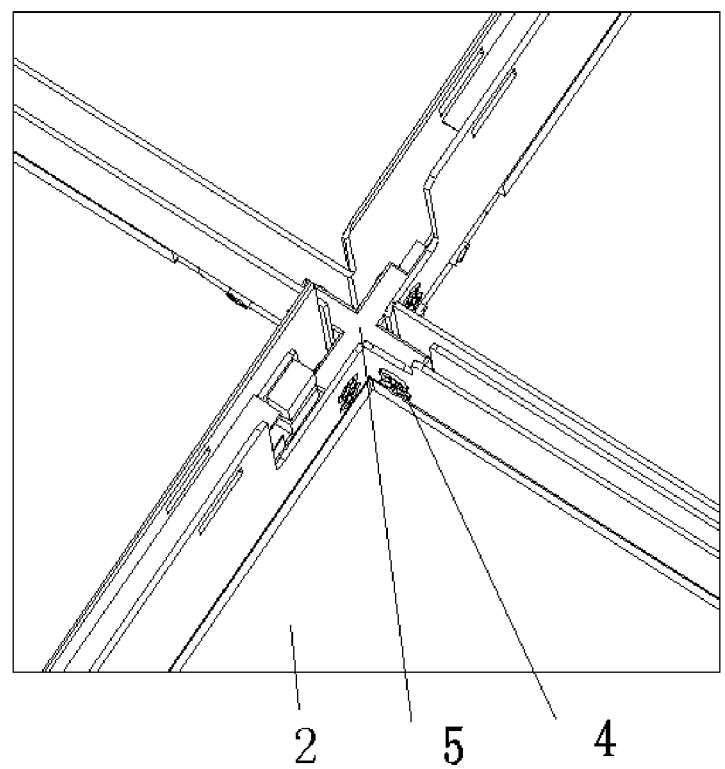
FIG. 4 is a schematic view of the cross, after the assembling, according to an embodiment of the present disclosure.

The second embodiment is different from the first embodiment in that, referring to FIGS. 3 and 4, the spliced display device further comprises a cross 5 for splicing the four display modules 2 with each other, thereby improving structural strength of the whole device such that the display modules 2 after the splicing are difficult to deform.

Specifically, in the present embodiment, the display modules 2 are arranged in a matrix, e.g., a 2×2 matrix. Of course, the number of the display modules 2 can be others greater than four. The cross 5 is placed in a juncture among four display modules 2 (i.e., a crossing point among splicing faces of the four display modules 2) and is connected to the display modules 2 by fasteners such as screws. A plurality of securing holes 51 for passing the fasteners 4 such as screws therethrough is formed in the cross 5. When in use, every end of the cross 5 is connected with adjacent edges of every two of the display modules 2 by the fasteners 4 such as screws. Of course, for mounting of the cross 5, a crossed groove for receiving the cross 5 may be formed among the display modules 2. Such cross 5 enhances structural strength of the whole device without interfering displaying of the image.

Third Embodiment

A spliced display device according to a third embodiment of the present disclosure will be described, wherein technical contents of the third embodiment which are the same as those of the second embodiment are omitted to avoid duplicating description, although such technical contents of the second embodiment can be employed in the third embodiment.

Figure 2:
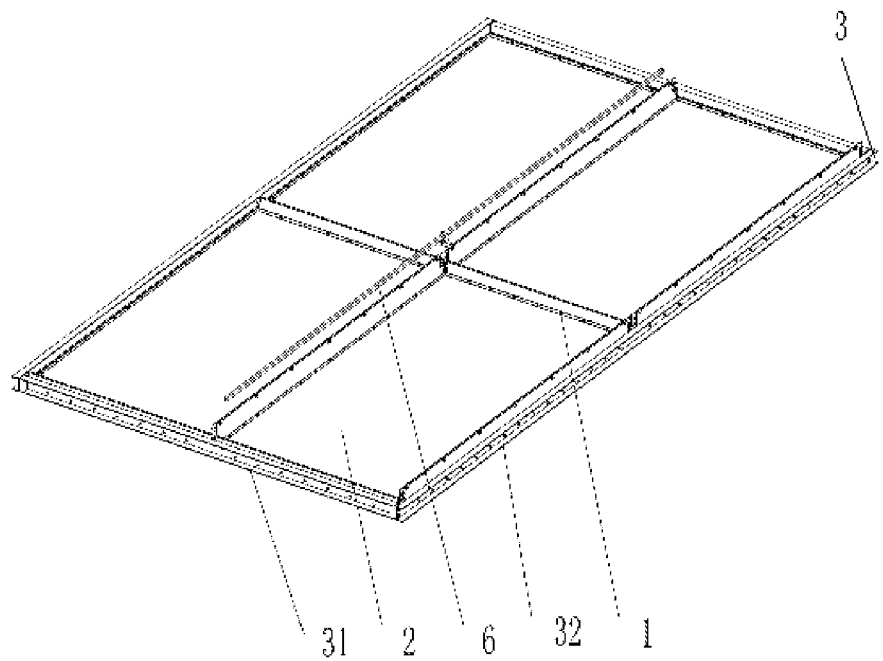
FIG. 2 is a schematic view of assembling of a connection element according to an embodiment of the present disclosure.
Figure 6:
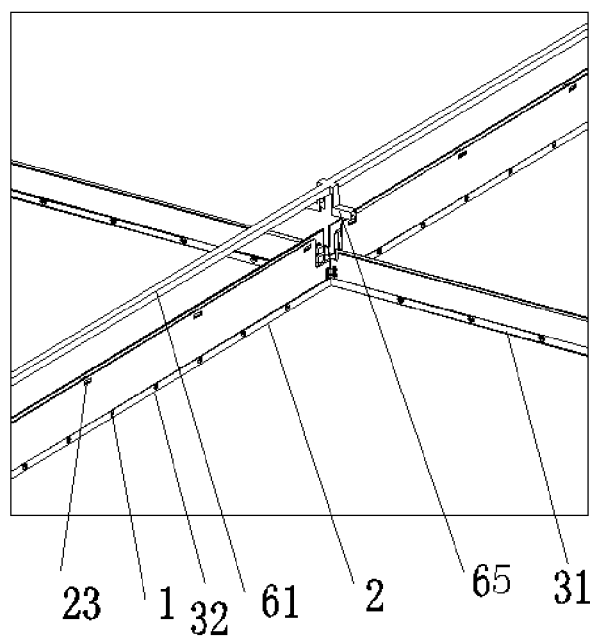
FIG. 6 is a schematic view of the connection element and display modules, before the assembling, according to an embodiment of the present disclosure.
Figure 7:
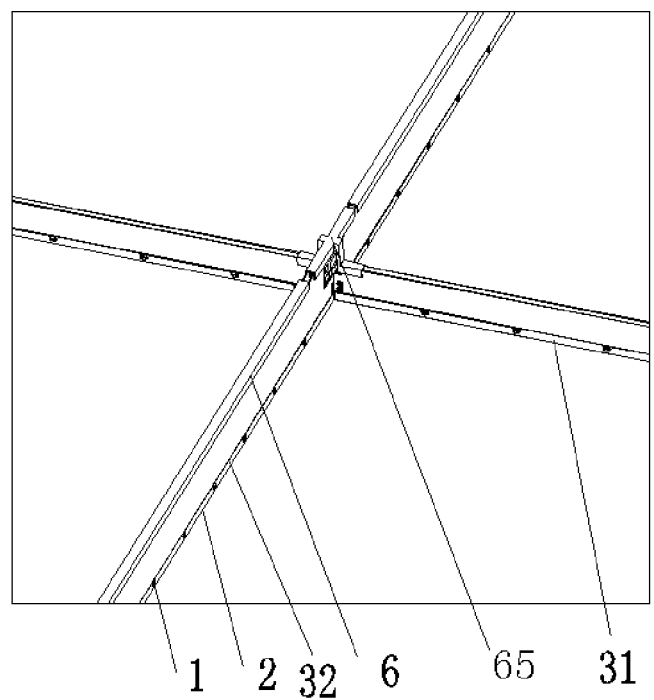
FIG. 7 is a schematic view of the connection element and the display modules, after the assembling, according to an embodiment of the present disclosure.

The third embodiment is different from the second embodiment in that, referring to FIGS. 2, 6 and 7, the spliced display device further comprises a connection element 6 placed at a splicing face of the image displaying region, to not only fixedly connect these display modules 2 together, but also cover and secure circuit board in the splicing face.

It should be noted that, the connection element 6 itself may be an integrated connection element, or a divided connection element. If the connection element 6 is an integrated one, the connection element 6 has a shape corresponding to the splicing face and is entirely engaged on the display modules 2. Alternatively, if the connection element 6 is a divided one, a joint 65 is provided over the cross 5, and the transverse connection elements (not shown in figures) and the longitudinal connection elements 61 are extended along the respective directions of the splicing faces, respectively.

Of course, in order to facilitate the assembling, clasp members (not shown in figures) are provided on the connection element 6 while clasp holes 23 are formed in the display modules 2 for fastening the clasp members therein, to achieve a fast assembling.

The present disclosure also provides a display system comprising: the abovementioned spliced display device and a drive circuit board for driving the spliced display device for generating an image.

Concerning the above, the spliced display device according to the present disclosure adopts an image displaying region consisted of a plurality of display modules and reinforces these display modules by components including the frame, the cross, the connection element, and so on, which effectively enhances structural strength of the display device so that it is difficult to deform under the action of external force.

Purposes, technical solutions and advantageous effects of the present disclosure have been further illustrated in the above specific embodiments. It should be understood that the above description is merely used to illustrate specific embodiments of the present disclosure, but not to limit the present disclosure. All of changes, equivalent alternatives, improvements, made within principles and spirit of the disclosure, should be included within the scope of the disclosure, and the scope of which is defined in the claims and their equivalents.

What is claimed is:

1. A spliced display device, comprising:
   a frame;
   a plurality of display modules; and
   a cross;
   wherein the plurality of display modules is spliced to form an image displaying region, and the frame is disposed around a periphery of the image displaying region; and
   wherein the frame comprises transverse frame parts, and longitudinal frame parts connected to the transverse frame parts, and wherein the transverse frame parts and the longitudinal frame parts are secured to the periphery of the image displaying region; and
   wherein the plurality of display modules are arranged in a matrix; and
   wherein the cross is placed at a juncture among the transverse frame parts and the longitudinal frame parts, and connected to the plurality of display modules by fasteners.

2. The spliced display device of claim 1, wherein the transverse frame parts are connected to the longitudinal frame parts by fasteners, and clearances are provided between the transverse frame parts and the longitudinal frame parts.

3. The spliced display device of claim 1, wherein the cross is provided with a plurality of securing holes for passing the fasteners therethrough.

4. The spliced display device of claim 1, further comprising a connection element placed at a splicing face among the display modules and connected to the display modules.

5. The spliced display device of claim 4, wherein the connection element comprises a clasp member and the display module correspondingly comprises a clasp hole for fastening the clasp member therein.

6. The spliced display device of claim 1, wherein the plurality of display modules are connected with each other by fasteners.

7. The spliced display device of claim 6, wherein the fasteners comprise screws or clasps.

8. The spliced display device of claim 1, wherein the display module comprises a transparent liquid crystal panel.

9. A display system, comprising a spliced display device of claim 1.

10. The display system of claim 9, wherein the transverse frame parts are connected to the longitudinal frame parts by fasteners, and clearances are provided between the transverse frame parts and the longitudinal frame parts.

11. The display system of claim 9, wherein the cross is provided with a plurality of securing holes for passing the fasteners therethrough.

12. The display system of claim 9, further comprising a connection element placed at a splicing face among the display modules and connected to the display modules.

13. The display system of claim 12, wherein the connection element comprises a clasp member and the display module correspondingly comprises a clasp hole for fastening the clasp member therein.

14. The display system of claim 9, wherein the plurality of display modules is connected with each other by fasteners.

15. The display system of claim 14, wherein the fasteners comprise screws or clasps.

16. The display system of claim 9, wherein the display module comprises a transparent liquid crystal panel.

* * * * *